United States Patent
Nakanishi et al.

(10) Patent No.: US 8,198,381 B2
(45) Date of Patent: Jun. 12, 2012

(54) PHENOL ARALKYL EPOXY RESIN WITH SECONDARY HYDROXYL GROUPS

(75) Inventors: Masataka Nakanishi, Kita-ku (JP); Katsuhiko Oshimi, Kita-ku (JP); Kazuyuki Ohhashi, Kita-ku (JP); Toru Kurihashi, Kita-ku (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 269 days.

(21) Appl. No.: 12/083,030

(22) PCT Filed: Oct. 16, 2006

(86) PCT No.: PCT/JP2006/320537
§ 371 (c)(1), (2), (4) Date: Jun. 27, 2008

(87) PCT Pub. No.: WO2007/046316
PCT Pub. Date: Apr. 26, 2007

(65) Prior Publication Data
US 2009/0117388 A1 May 7, 2009

(30) Foreign Application Priority Data

Oct. 21, 2005 (JP) .................... 2005-306475
Nov. 22, 2005 (JP) .................... 2005-337316

(51) Int. Cl.
C08K 5/07 (2006.01)
C08K 5/16 (2006.01)
C08K 5/523 (2006.01)
C08L 61/14 (2006.01)
C08L 63/00 (2006.01)

(52) U.S. Cl. ........ 525/507; 523/428; 523/434; 523/451; 523/454; 523/456; 525/109; 525/113; 525/114; 525/423; 525/481; 525/485; 525/486; 525/488

(58) Field of Classification Search .................... None
See application file for complete search history.

(56) References Cited

U.S. PATENT DOCUMENTS

2008/0200636 A1 * 8/2008 Nakanishi et al. ............ 528/105

FOREIGN PATENT DOCUMENTS

| JP | 2003-301031 | | 10/2003 |
|---|---|---|---|
| JP | 2003-301031 A | * | 10/2003 |
| JP | 2004-307761 | | 11/2004 |
| JP | 2004-359849 | | 12/2004 |
| JP | 2005-15616 | | 1/2005 |
| JP | 2005-206707 | | 8/2005 |
| JP | 2005-248147 | | 9/2005 |

OTHER PUBLICATIONS

Malaysian Communication mailed Jun. 15, 2008 in corresponding foreign patent application No. PI 20081169.
International Preliminary Report on Patentability (IPRP) issued Apr. 22, 2008 in corresponding international patent application No. PCT/JP20061320537.
Form PCT/IB/338 mailed Sep. 18, 2008 and accompanied by English translation of IPRP in corresponding international patent application No. PCT/JP2006/320537.

* cited by examiner

*Primary Examiner* — Robert Sellers
(74) *Attorney, Agent, or Firm* — Nields, Lemack & Frame, LLC

(57) ABSTRACT

Disclosed is a phenol aralkyl epoxy resin having a structure wherein at least a phenol or a naphthol is bound by using an aralkyl group as a linking group and a structure represented by formula (1) below, while satisfying the condition 1 below. This epoxy resin is excellent in workability during production of a composition and is easy to control quality. Condition 1: The following relation ($\alpha$) is satisfied with A being the hydroxyl equivalent (as measured in accordance with JIS K 0070) of a phenol-modified epoxy resin obtained by adding an equivalent molar amount of phenol relative to the epoxy equivalent of the epoxy resin, and B being the epoxy equivalent of the epoxy resin. $50 \leq 1000 \times (A-B)/B \leq 250$ ($\alpha$).

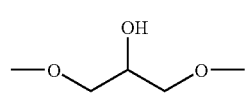

(1)

4 Claims, No Drawings

PHENOL ARALKYL EPOXY RESIN WITH SECONDARY HYDROXYL GROUPS

TECHNICAL FIELD

The present invention relates to an epoxy resin giving a curable resin composition which is useful for the applications such as insulating materials for electric/electronic elements (high reliability semiconductor sealing materials and the like), and various composite materials including laminates (printed wiring boards, build-up boards and the like) or CFRP, adhesives, coating materials, and inter alia, particularly for the applications of laminates, and which is also useful as a resin composition for insulating materials for metal foil clad laminates and build-up boards, flexible board materials and the like, and more specifically, as a resin composition for the production of copper clad laminates used in electronic circuit boards, and a cured product of the composition.

BACKGROUND ART

Epoxy resins have good workability, and form cured products that are excellent in the electrical properties, thermal resistance, adhesiveness, moisture resistance (water resistance) and the like. The epoxy resins are used in a wide range of applications such as electric/electronic elements, structural materials, adhesives and coating materials.

However, in recent years, along with the development in the electric and electronic fields, there is a demand for further improvements in the general properties of a resin composition, such as purity enhancement, improvements in moisture resistance, adhesiveness and dielectric properties, viscosity lowering intended for filling in more fillers, and reactivity enhancement intended for making molding cycles shorter. Also, as for a structural material, there is a demand for a material having light weight and excellent mechanical properties, in the applications of aerospace materials, instruments for leisure and sports activities, and the like. Moreover, in recent years, although halogen-based epoxy resins and antimony trioxide are largely used as flame retardants, and particularly as flame retardants for electric and electronic elements, products using these materials have been accused of contributing to the generation of toxic materials such as dioxin, due to inappropriate waste treatment thereof. As an exemplary method for addressing the problems described above, Patent Document 1, Patent Document 2 or the like describes the use of a phenol aralkyl resin having a biphenyl skeleton, or an epoxide of such resin. However, resins having this structure have a strong tendency to crystallize, and thus crystals precipitate out depending upon the conditions for isolating the resin during the production, or the storage conditions, thus resulting in an increase in the melt viscosity. Furthermore, even in the case of dissolving the resin in a solvent, crystals precipitate out and settle down, and causing a serious problem in the use as a composition.

Under such circumstances, it has been investigated in Patent Document 3 to lower this crystallizability by controlling the orientation properties, but the results are still unsatisfactory.

Patent Document 1: Japanese Patent Application Laid-open No. 11-140277
Patent Document 2: Japanese Patent Application Laid-open No. 11-140166
Patent Document 3: Japanese Patent Application Laid-open No. 2003-301031

DISCLOSURE OF THE INVENTION

Problems to be Solved by the Invention

An object of the present invention is to provide an epoxy resin which is useful for the insulating materials for electric/electronic elements (high reliability semiconductor sealing materials, etc.) and laminates (printed wiring boards, build-up boards, etc.), as well as various composite materials including CFRP, adhesives, coating materials and the like, due to the good workability during the production of a composition or easy quality control, achieved by suppressing precipitation of crystals, and general properties for cured products of the epoxy resin have been improved; and a curable resin composition using this epoxy resin.

Means for Solving the Problems

The inventors of the present invention have devotedly conducted research in order to solve the problems described above, and as a result, they completed the present invention.

Therefore, the present invention relates to:

(1) An epoxy resin having a structure formed by binding at least a phenol or a naphthol with an aralkyl group as a linking group, and a structure represented by formula (1):

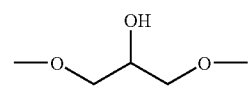

(1)

wherein the epoxy resin is a phenol aralkyl type epoxy resin satisfying the following condition:

Condition: With A being the hydroxyl equivalent (measured according to JIS K 0070) of a phenol-modified epoxy resin obtained by adding a molar equivalent of phenol to the epoxy equivalent of the epoxy resin, and B being the epoxy equivalent of the epoxy resin, the relationship between A and B satisfies the following relationship expression (α):

$$150 \leq 1000 \times (A-B)/B \leq 250 \quad (\alpha);$$

(2) The epoxy resin according to (1) above, being a reaction product of a phenol aralkyl resin having a structure represented by the following general formula (2), and epihalohydrin:

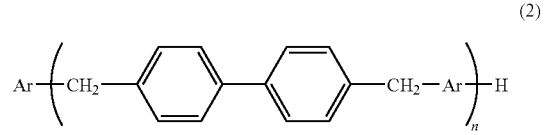

(2)

wherein each Ar represents a phenol of the following general formula (3) or a naphthol of the following general formula (4):

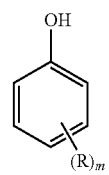

(3)

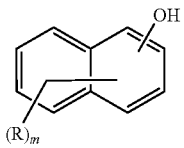
(4)

(wherein in each of the formulas, each R represents a hydrogen atom, a hydrocarbon group having 1 to 15 carbon atoms, trifluoromethyl group, an allyl group or an aryl group, while R's may be identical to or different from each other; and m represents an integer from 0 to 3),
while Ar's may be identical to or different from each other, and when Ar's are different, they may be arranged in any order; and n represents an average of a repeating number from 1 to 10;

(3) The epoxy resin according to (2) above, wherein all of R's are hydrogen atoms;

(4) The epoxy resin according to (2) or (3) above, wherein all of Ar's are phenols of the formula (3);

(5) An epoxy resin varnish containing the epoxy resin according to any one of (1) to (4) above, and a solvent;

(6) A curable resin composition containing the epoxy resin according to any one of (1) to (4) above, and a curing agent;

(7) A curable resin composition containing the epoxy resin according to any one of (1) to (4) above, and a cyanate resin or a prepolymer thereof, (8) A cured product formed by curing the curable resin composition according to (6) or (7) above;

(9) A prepreg formed by impregnating a base material with the epoxy resin varnish according to (5) above or the curable resin composition according to (6) above; and

(10) A flame retardant laminate or copper-clad laminate formed by hot pressing one sheet, or two or more superimposed sheets of the prepreg according to (9) above.

Effects of the Invention

The phenol aralkyl type epoxy resin of the present invention hardly undergoes precipitation of crystals even if dissolved in a solvent and stored at low temperature, and thus can prevent a decrease in the performance after long-term storage of a resin composition using the epoxy resin. A cured product of the epoxy resin composition is superior to the products conventionally available from the market in terms of thermal resistance and mechanical strength. As such, since the epoxy resin has good workability during the production of a composition, quality control thereof is easy, and the properties of the cured products can also be improved, the epoxy resin is useful for the insulating materials for electric/electronic elements (high reliability semiconductor sealing materials, etc.) and laminates (printed wiring boards, build-up boards, etc.), as well as various composite materials including CFRP, adhesives, coating materials, and the like.

BEST MODE FOR CARRYING OUT THE INVENTION

The phenol aralkyl type epoxy resin of the present invention can be obtained by a method of reacting a raw material phenol aralkyl resin with epihalohydrin so as to three-dimensionally bind phenol aralkyl resins, or a method of reacting a phenol aralkyl resin with a phenol aralkyl type epoxy resin.

The phenol aralkyl resin used in the present invention is a resin having a molecular structure in which phenolic or naphtholic aromatic rings are bound through an alkylidene bond such as a methylene bond, an ethylidene bond or a propylidene bond, and can be obtained by, for example, subjecting a phenol or a naphthol having a substituent R, and a bishalogenomethyl derivative, a bishalogenoethyl derivative, a bishalogenopropyl derivative; a bisalkoxymethyl derivative, a bisalkoxyethyl derivative, a bisalkoxypropyl derivative; a bishydroxymethyl derivative, a bishydroxyethyl derivative, a bishydroxypropyl derivative or the like of phenyl, biphenyl, fluorenyl or naphthyl, to a condensation reaction. The phenol aralkyl resin is preferably a compound obtained by subjecting a phenol or a naphthol, more preferably a phenol, and even more preferably phenol and a compound having a biphenyl skeleton, to a condensation reaction, and is even more preferably a compound represented by the following general formula (2):

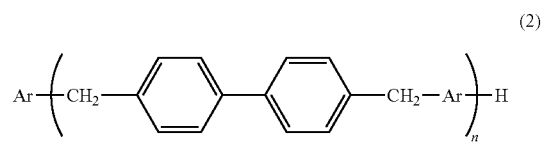
(2)

wherein each Ar represents a phenol of the following general formula (3) or a naphthol of the following general formula (4):

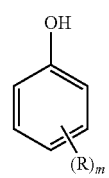
(3)

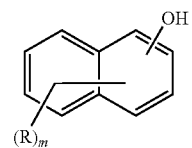
(4)

(wherein in each of the formulas, each R represents a hydrogen atom, a hydrocarbon group having 1 to 15 carbon atoms, trifluoromethyl group, an allyl group or an aryl group, and R's may be identical to or different from each other; m represents an integer from 0 to 3),
while Ar's may be identical to or different from each other, and when Ar's are different, they may be arranged in any order; and n represents an average of a repeating number from 1 to 10.

In the general formula (2) above, each R independently represents a hydrogen atom, a hydrocarbon group having 1 to 15 carbon atoms, trifluoromethyl group, an allyl group or an aryl group. As the hydrocarbon group having 1 to 15 carbon atoms, there may be mentioned a chain or cyclic alkyl group such as a methyl group, an ethyl group, an n-propyl group, an isopropyl group, a cyclopropyl group, an n-butyl group, a sec-butyl group, a tert-butyl group, an isobutyl group, a cyclobutyl group, an n-pentyl group, an isopentyl group, a neopentyl group, a tert-pentyl group, a cyclopentyl group, an n-hexyl group, an isohexyl group, a cyclohexyl group, an n-heptyl group, a cycloheptyl group, an n-octyl group or a cyclooctyl group, or the like. Further, as the aryl group, a phenyl group, a naphthyl group, a toluoyl group or the like may be mentioned. Among these, a hydrogen atom, a methyl group, an allyl group or a tert-butyl group is preferred, and a hydrogen atom is particularly preferred. The substitution position of R is not particularly limited, but it is preferable that the substitution positions may be each independently the ortho-position or meta-position relative to the hydroxyl group. n represents 1 to 10 as an average value, and is preferably in the range of 1 to 5.0.

The phenol aralkyl resin which serves as the raw material of the epoxy resin of the present invention is available as commercially marketed products, and specifically, the XLC series manufactured by Mitsui Chemicals, Inc., MEH-7851 manufactured by Meiwa Plastic Industries, Ltd., the KAYA-HARD GPH series manufactured by Nippon Kayaku Co., Ltd., and the like may be mentioned.

Hereinafter, an exemplary method for producing the epoxy resin of the present invention will be described.

The epoxy resin of the present invention is characterized in having a structure represented by formula (1):

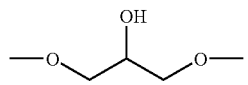

(1)

in the skeleton. Such bond is a structure obtained in the case where an epoxy resin is reacted with a phenol compound or an alcohol compound.

The epoxy resin of the present invention can be obtained by, for example, a method of reacting a phenol aralkyl resin with epihalohydrin in the presence of an alkali metal hydroxide. In this case, the amounts of use of the epihalohydrin and the alkali metal hydroxide become the factors for determining the rate of introduction for the relationship expression ($\alpha$) described above.

In the reaction for obtaining the epoxy resin of the present invention, epihalohydrin that can be used may be epichlorohydrin, epibromohydrin or the like, while epichlorohydrin, which is industrially easily available, is preferred. The amount of use of epihalohydrin is usually 0.5 to 10.0 moles, and preferably 1.5 to 4.0 moles, relative to 1 mole of the hydroxyl group of the phenol aralkyl resin previously described.

The alkali metal hydroxide that can be used in the above reaction may be sodium hydroxide, potassium hydroxide or the like, and the compound may be used in the solid state or may be used in the form of an aqueous solution. In the case of using an aqueous solution thereof, there may be used a method in which an aqueous solution of the alkali metal hydroxide is added continuously to the reaction system, and at the same time, water and epihalohydrin are continuously distilled out under reduced pressure or under normal pressure, followed by partitioning to removing water, while continuously returning epihalohydrin into the reaction system. The amount of use of the alkali metal hydroxide is usually 0.3 to 2.5 moles, preferably 0.5 to 2.0 moles, relative to 1 mole of the hydroxyl group of the phenol aralkyl resin.

The structure of the epoxy resin of the present invention can be adjusted by means of the proportions of the epihalohydrin and alkali metal hydroxide. Although not established as highly preferred conditions, for example, when epihalohydrin is used in an amount of 1.0 to 4.0 moles relative to 1 mole of the hydroxyl group of the phenol aralkyl resin, the amount of the alkali metal hydroxide is preferably 1.00 to 1.20 moles. Furthermore, if the amount of epihalohydrin is 4.0 to 10.0 moles, it is preferable, but not limited to, that the amount of the alkali metal hydroxide is adjusted between 0.5 and 1.05 moles.

In order to accelerate the reaction, it is preferable to add a quaternary ammonium salt such as tetramethylammonium chloride, tetramethylammonium bromide or trimethylbenzylammonium chloride as catalyst. The amount of use of the quaternary ammonium salt is usually 0.1 to 15 g, and preferably 0.2 to 10 g, relative to 1 mole of the hydroxyl group of the phenol aralkyl resin.

Here, it is preferable, in terms of carrying out the reaction, to perform the reaction after adding alcohols such as methanol, ethanol or isopropyl alcohol; an aprotic polar solvent such as dimethylsulfone, dimethylsulfoxide, tetrahydrofuran or dioxane; or the like.

In the case of using an alcohol, the amount of use thereof is usually 2 to 50% by weight, and preferably 4 to 20% by weight, relative to the amount of use of epihalohydrin. In the case of using an aprotic polar solvent, the amount of use thereof is usually 5 to 100% by weight, and preferably 10 to 80% by weight, relative to the amount of use of epihalohydrin.

The reaction temperature is usually 30 to 90° C., and preferably 35 to 80° C. The reaction time is usually 0.5 to 10 hours, and preferably 1 to 8 hours. The reaction product of such epoxidation reaction is subjected, after washing with water or without washing, to the removal of epihalohydrin, solvent or the like while heating under reduced pressure. Furthermore, in order to obtain an epoxy resin having less hydrolysable halogen, the recovered epoxy resin can also be dissolved in a solvent such as toluene or methyl isobutyl ketone, and subjected to a reaction after adding an aqueous solution of an alkali metal hydroxide such as sodium hydroxide or potassium hydroxide, so as to assure ring closure. In this case, the amount of use of the alkali metal hydroxide is usually 0.01 to 0.3 moles, and preferably 0.05 to 0.2 moles, relative to 1 mole of the hydroxyl group of the phenol aralkyl resin used in the epoxidation. The reaction temperature is usually 50 to 120° C., and the reaction time is usually 0.5 to 2 hours.

After completion of the reaction, a salt thus generated is removed by filtration, washing with water or the like, and the solvent is distilled off while heating under reduced pressure, to thus obtain the epoxy resin of the present invention.

The epoxy resin of the present invention may also be obtained, in addition to using the synthesis method described above, by reacting a phenol aralkyl resin with an epoxy resin of the type of phenol aralkyl resin of formula (2) prepared by a known method (for example, Patent Document 1) in an amount of less than an equivalent, so that the phenolic hydroxyl group and the epoxy group are partially reacted.

The epoxy resin obtained as such turns out to be an epoxy resin having the structure of formula (1) in the molecule.

The phenol aralkyl type epoxy resin of the present invention is an epoxy resin for which the following relationship expression ($\alpha$) between A and B is satisfied, with A being the hydroxyl equivalent (measured according to JIS K 0070) of a phenol-modified epoxy resin obtained by adding a molar equivalent of phenol to the epoxy equivalent of the epoxy resin, and B being the epoxy equivalent of the epoxy resin.

$$150 \leq 1000 \times (A-B)/B \leq 250 \qquad (\alpha).$$

Furthermore, in the above description, the phenol-modified epoxy resin obtained by adding a molar equivalent of phenol is a product obtained by performing a reaction under the following conditions.

A modified epoxy resin for the measurement of hydroxyl equivalent A can be obtained by adding 20 parts by weight of methyl isobutyl ketone to 100 parts by weight of an epoxy resin to dissolve the resin, subsequently adding 1.02 equivalents of phenol and 0.1 parts by weight of triphenylphosphine, based on the epoxy group, performing a reaction at 120 to 130° C. for 15 hours, and then distilling off the solvent and unreacted phenol in a rotary evaporator at 180° C. under reduced pressure. Furthermore, it is also possible to calculate the hydroxyl equivalent of the epoxy resin of the present invention from the above-obtained value, and the value usually falls between 2600 and 5500 g/eq., preferably between 2650 and 5250 g/eq., more preferably between 2600 and 3900 g/eq., and most preferably between 2600 and 3300 g/eq.

In the relationship expression ($\alpha$) described above, (A−B)/B reflects the ratio of the amount of hydroxyl group and the amount of epoxy group in the phenol aralkyl type epoxy resin of the present invention. A−B represents the difference between the hydroxyl equivalent and the epoxy equivalent of the epoxy resin. Since a hydroxyl group appears upon the ring-opening of an epoxy group, a comparison with the theoretical hydroxyl equivalent can be made, and when this is divided by the epoxy equivalent, the molecular weight factor can be eliminated. Thus, the proportion of the hydroxyl group present in the molecule can be compared in a simple manner. Multiplying by 1000 is intended to make the obtained numerical value to be easily understood. As described below, according to the finding of the present inventors, when 1000×(A−B)/B exceeds 250, the amount of hydroxyl groups is small, and thus the stability of the epoxy resin to a solvent is poor, and crystals may easily precipitate out. If the value is less than 150, the amount of glycidyl groups of the epoxy resin is too small, and thus the properties of a cured product, particularly thermal resistance thereof, are deteriorated, which is not desirable. From this point of view, in the above relationship expression ($\alpha$), 1000×(A−B)/B is preferably 230 or less.

The epoxy resin varnish of the present invention contains the epoxy resin of the present invention and a solvent as essential components, where an increase in the amount of hydroxyl groups enhances the solubility to solvents, thereby decreasing the crystallizability. For example, in the case of using methyl ethyl ketone, methyl isobutyl ketone, toluene or the like as the solvent, not only under refrigerating conditions such as 5° C., but also under severer conditions such as 0° C. or −10° C., crystals do not precipitate out for at least several months. Furthermore, although the hydroxyl group plays a role of improving adhesiveness of the composition, if too many hydroxyl groups are introduced into a molecule, mechanical properties will be lost. Thus, it is preferable to introduce the hydroxyl groups within the above-described range, while considering the balance of the properties. An epoxy resin of the present invention satisfying such conditions would have lower crystallizability when compared with a phenol aralkyl type epoxy resin having a value of the relationship expression ($\alpha$) out of the aforementioned range, even if they had the same softening point.

The softening point of the obtained epoxy resin is 60° C. or higher, and preferably 70° C. or higher, while it is preferably 130° C. or lower, and more preferably 110° C. or lower from the viewpoint of convenient use.

Next, the curable resin composition of the present invention will be described.

The curable resin compositions of the present invention may be roughly classified into (a) a curable resin composition containing the epoxy resin of the present invention and a curing agent, and (b) a curable resin composition containing the epoxy resin of the present invention and a cyanate resin or a prepolymer thereof.

The curable resin composition (a) of the present invention contains the epoxy resin of the present invention and a curing agent. The curable resin composition may also contain a cyanate resin in combination as an optional component. For the curable resin composition (a) of the present invention, the epoxy resin of the present invention can be used alone, or in combination with another epoxy resin. In the case of using epoxy resins in combination, the proportion occupied by the epoxy resin of the present invention in the epoxy resins is preferably 5% by weight or more, and more preferably 10% by weight or more. In addition, the epoxy resin of the present invention can also be used as an additive or a modifying material for resin compositions other than the curable resin composition of the present invention, and can improve flexibility, flame retardancy and the like.

Specific examples of the other epoxy resin which can be used in combination with the epoxy resin of the present invention, include bisphenols (bisphenol A, bisphenol F, bisphenol S, biphenol, bisphenol AD and the like); polycondensates of phenols (phenol, alkyl-substituted phenol, aromatic-substituted phenol, naphthol, alkyl-substituted naphthol, dihydroxybenzene, alkyl-substituted dihydroxybenzene, dihydroxynaphthalene and the like) and various aldehydes (formaldehyde, acetaldehyde, alkyl aldehyde, benzaldehyde, alkyl-substituted benzaldehyde, hydroxybenzaldehyde, naphthaldehyde, glutaraldehyde, phthaldehyde, crotonaldehyde, cinnamaldehyde and the like); polymers of phenols and various diene compounds (dicylopentadiene, terpenes, vinylcyclohexene, norbornadiene, vinylnorbornene, tetrahydroindene, divinylbenzene, divinylbiphenyl, diisopropenylbiphenyl, butadiene, isoprene and the like); polycondensates of phenols and ketones (acetone, methyl ethyl ketone, methyl isobutyl ketone, acetophenone, benzophenone and the like); polycondensates of phenols and aromatic dimethanols (benzenedimethanol, biphenyldimethanol and the like); polycondensates of phenols and aromatic dichloromethyls ($\alpha,\alpha'$-dichloroxylene, bischloromethylbiphenyl and the like); polycondensates of phenols and aromatic bisalkoxymethyls (bismethoxymethylbenzene, bismethoxymethylbiphenyl, bisphenoxymethylbiphenyl and the like); polycondensates of bisphenols and various aldehydes; glycidyl ether-based epoxy resins obtained by glycidylating alcohols; alicyclic epoxy resins; glycidylamine-based epoxy resins; glycidyl ester-based epoxy resins; and the like, but the other epoxy resin is not limited to these as long as it is a conventionally used epoxy resin. These compounds may be used individually or in combination of two or more species.

Examples of the curing agent for the curable resin composition (a) of the present invention include amine-based compounds, acid anhydride-based compounds, amide-based compounds, phenol-based compounds and the like. Specific examples of the curing agent that can be used include, but not limited to, diaminodiphenylmethane, diethylenetriamine, triethylenetetramine, diaminodiphenylsulfone, isophoronediamine, dicyandiamide, a polyamide resin synthesized from a dimer of linoleic acid and ethylenediamine, phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride, methylhexahydrophthalic anhydride, bisphenols (bisphenol A, bisphenol F, bisphenol S, biphenol, bisphenol AD and the like), polycondensates of phenols (phenol, alkyl-substituted phenol, aromatic-substituted phenol, naphthol, alkyl-substituted naphthol, dihydroxybenzene, alkyl-substituted dihydroxybenzene, dihydroxynaphthalene and the like) and various aldehydes (formaldehyde, acetaldehyde, alkyl aldehyde, benzaldehyde, alkyl-substituted benzaldehyde, hydroxybenzaldehyde, naphthaldehyde, glutaraldehyde, phthalaldehyde, crotonaldehyde, cinnamaldehyde and the like), polymers of phenols and various diene compounds (dicylopentadiene, terpenes, vinylcyclohexene, norbornadiene, vinylnorbornene, tetrahydroindene, divinylbenzene, divinylbiphenyl, diisopropenylbiphenyl, butadiene, isoprene and the like), polycondensates of phenols and ketones (acetone, methyl ethyl ketone, methyl isobutyl ketone, acetophenone, benzophenone and the like), polycondensates of phenols and aromatic dimethanols (benzenedimethanol, biphenyldimethanol and the like), polycondensates of phenols and aromatic dichloromethyls (α,α'-dichloroxylene, bischloromethylbiphenyl and the like), polycondensates of phenols and aromatic bisalkoxymethyls (bismethoxymethylbenzene, bismethoxymethylbiphenyl, bisphenoxymethylbiphenyl and the like), polycondensates of bisphenols and various aldehydes, and modification products thereof, imidazole, trifluoroborane-amine complex, guanidine derivatives, and the like.

The amount of use of the curing agent for the curable resin composition (a) of the present invention is preferably 0.5 to 1.5 equivalents, and particularly preferably 0.6 to 1.2 equivalents, relative to 1 equivalent of the epoxy group of the epoxy resin. When the amount of use is either less than 0.5 equivalents or more than 1.5 equivalents, relative to 1 equivalent of epoxy group, in both cases curing is incomplete, and there is a risk that good properties of cured products may not be obtained.

When the curing agent is used, a curing accelerator may be used in combination. Examples of the curing accelerator that can be used include imidazoles such as 2-methylimidazole, 2-ethylimidazole, 2-phenylimidazole and 2-ethyl-4-methylimidazole; tertiary amines such as 2-(dimethylaminomethyl)phenol, triethylenediamine, triethanolamine and 1,8-diazabicyclo(5.4.0)undecene-7; organic phosphines such as triphenylphosphine, diphenylphosphine and tributylphosphine; metal compounds such as tin octanoate; tetra-substituted phosphonium tetra-substituted borates such as tetraphenylphosphonium tetraphenylborate and tetraphenylphosphonium ethyltriphenylborate; tetraphenylborates such as 2-ethyl-4-methylimidazole tetraphenylborate and N-methylmorpholine tetraphenylborate; and the like. When a curing accelerator is to be used, the curing accelerator is used, as necessary, in an amount of 0.01 to 15 parts by weight relative to 100 parts by weight of the epoxy resin.

Furthermore, the curable resin composition (a) of the present invention can also contain, if necessary, inorganic fillers, various additives such as silane coupling agents, releasing agents and pigments, or various heat-curable resins. The inorganic fillers include, but are not limited to, powders or spherically formed beads of crystalline silica, fused silica, alumina, zirconia, calcium silicate, calcium carbonate, silicon carbide, silicon nitride, boron nitride, zirconia, forsterite, steatite, spinel, titania, talc and the like. These fillers may be used individually or in combination of two or more species. The amount of use of these inorganic fillers may vary with the uses, but for example, in the case of using the inorganic filler for the application of a sealant for semiconductors, it is preferable to use the inorganic filler at a proportion occupying 50 to 95% by weight of the curable resin composition, from the aspects of the thermal resistance, moisture resistance, mechanical properties and the like of the cured product of the curable resin composition (a).

The curable resin composition (a) of the present invention may further contain known additives, if necessary. Specific examples of the additives to be used include polybutadiene and modification products thereof, modification products of acrylonitrile copolymers, polyphenylene ether, polystyrene, polyethylene, polyimide, fluororesins, maleimide-based compounds, cyanate resins (or prepolymers thereof), silicone gels, silicone oils; inorganic filler materials such as silica, alumina, calcium carbonate, powdered quartz, powdered alumina, graphite, talc, clay, iron oxide, titanium oxide, aluminum nitride, asbestos, mica, powdered glass, glass fibers, glass non-woven fabrics or carbon fibers; surface treating agents for filler materials such as silane coupling agents; releasing agents; colorants such as carbon black, phthalocyanine blue and phthalocyanine green.

The curable resin composition (a) of the present invention can be obtained by mixing the above various components uniformly. The curable resin composition of the present invention can be easily made into a cured product by a method which is similar to conventionally known methods. For example, the curable resin composition of the present invention is obtained by sufficiently mixing the epoxy resin and a curing agent, and if necessary, a curing accelerator, an inorganic filler, additives and various heat-curable resins to a uniform state, using an extruder, a kneader, a roller or the like if necessary, and the cured product can be obtained by molding the curable resin composition by melt casting, transfer molding, injection molding, compression molding or the like, and then heating to 80 to 200° C. for 2 to 10 hours.

The curable resin composition (a) of the present invention may optionally contain a solvent. A curable resin composition containing a solvent (epoxy resin varnish) can be made into a cured product of the curable resin composition of the present invention, by hot press molding a prepreg which is obtained by impregnating a base material such as glass fibers, carbon fibers, polyester fibers, polyamide fibers, alumina fibers or paper with the curable resin composition, and heating the resultant to dryness. The solvent content of this curable resin composition is usually about 10 to 70% by weight, and preferably 15 to 70% by weight, based on the total amount of the curable resin composition of the present invention and the solvent. Furthermore, the curable resin composition containing the solvent can be used as a varnish as follows. Examples of the solvent include γ-butyrolactones, amide-based solvents such as N-methylpyrrolidone (NMP), N,N-dimethylformamide (DMF), N,N-dimethylacetamide and N,N-dimethylimidazolidinone; sulfones such as tetramethylenesulfone; ether-based solvents such as diethylene glycol dimethyl ether, diethylene glycol diethyl ether, propylene glycol monomethyl ether, propylene glycol monomethyl ether monoacetate and propylene glycol monobutyl ether, and preferably lower alkylene glycol mono- or di-lower alkyl ethers; ketone-based solvents such as methyl ethyl ketone and methyl isobutyl ketone, and preferably di-lower alkyl ketones having two alkyl groups which may be identical or different; and aromatic solvents such as toluene and xylene. These may be used individually, or as solvent mixtures of two or more species.

Furthermore, a sheet-like adhesive can be obtained by applying the varnish on a peelable film, removing the solvent under heating, and allowing the resultant to reach the B-stage. This sheet-like adhesive can be used as an interlayer insulating layer in multilayer substrates or the like.

Next, the curable resin composition (b) containing the epoxy resin of the present invention and a cyanate resin or a prepolymer thereof will be described. For the curable resin composition (b) of the present invention, the epoxy resin of the present invention can be used alone or in combination with another epoxy resin. In the case of using in combination, the proportion occupied by the epoxy resin of the present invention in the epoxy resins is preferably 5% by weight or more, and particularly preferably 10% by weight or more.

As the other epoxy resin which can be used in combination with the epoxy resin of the present invention, the other epoxy resins described previously may be mentioned.

Specific examples of the cyanate resin that can be used for the curable resin composition (b) of the present invention include compounds having a bisphenol type structure, such as bis(3,5-dimethyl-4-cyanatophenyl)methane, bis(4-cyanatophenyl)methane, bis(3-methyl-4-cyanatophenyl)methane, bis(3-ethyl-4-cyanatophenyl)methane, 4,4-isopropylidenebisphenyl isocyanate, 4,4-isopropylidenebis-2-methylphenyl isocyanate, 1,1-bis(4-cyanatophenyl)ethane, 1,2-bis(4-cyanatophenyl)ethane and 2,2-bis(4-cyanatophenyl)propane, as well as 4,4-dicyanato-diphenyl, di(4-cyanatophenyl)ether, di(4-cyanatophenyl)thioether, di(4-cyanato-3-tert-butyl-6-methylphenyl)thioether, 1,4-bis(4-cyanatophenylmethyl)benzene, 4,4-{1,3-phenylenebis(1-methylethylidene)}bisphenyl cyanate, 4,4-{1,3-phenylenebis(methylethylideneisopropylidene)}bisphenyl cyanate, 4,4-bis(4-cyanatophenyl)methyl-1,1-biphenyl, 4,4-bis(4-cyanato-3-methylphenyl)methyl-1,1-biphenyl, 2,2-bis(4-cyanatophenyl)-1,1,1,3,3,3-hexafluoropropane, di(4-cyanatophenyl)fluorene, 1,1-bis(4-cyanatophenyl)cyclohexane, 2,2-bis(4-cyanatophenyl)adamantane, 9,9-bis(4-cyanatophenyl)fluorene, 9,9-bis(4-cyanato-3-methylphenyl)fluorene, 9,9-bis(4-cyanato-3-phenylphenyl)fluorene, 9,9-bis(4-cyanato-3-allylphenyl)fluorene, 4,4-bis(isocyanatophenylmethyl)-1,1'-biphenyl and the like. Furthermore, examples of cyanate esters of trivalent phenols include 1,1,1-tris(4-cyanatophenyl)ethane, 1,1-bis(3,5-dimethyl-4-cyanatophenyl)-1-(4-cyanatophenyl)ethane and the like. In addition to the cyanate resins described above, there may be mentioned various cyanate resins obtained by reactions between various phenol resins (including the bisphenols, polycondensates of phenols and various aldehydes, polymers of phenols and various diene compounds, polycondensates of phenols and ketones, polycondensates of phenols and aromatic dimethanols, polycondensates of phenols and aromatic dichloromethyls, polycondensates of bisphenols and various aldehydes, and the like described in the section for curing agent) with, for example, cyanate chloride, but the invention is not limited thereto.

Which cyanate resin among these cyanate resins should be used can be appropriately selected in accordance with the use, from those having the properties required for the cured products, or those having a wide range of properties including from those being in the liquid state to those being in the solid state at normal temperature due to their structures, and are not particularly limited. Furthermore, converting in advance the cyanate compound into a prepolymer (usually generates a cyclic trimer) decreases the dielectric constant, and it is suitable for preventing precipitation of crystals when the resin composition is used as varnish. In the case of using a cyanate compound and/or a prepolymer using the same as the raw material for the curable resin composition of the present invention, this component is used in a proportion of usually 20 to 95% by weight, and preferably 30 to 85% by weight, based on the total weight of the three components such as the cyanate compound, the epoxy resin of the present invention and the other epoxy resin used as an optional component (described above) (hereinafter, referred to as resin components).

The curable resin composition (b) of the present invention may also contain a phosphorus compound as a component imparting flame retardancy. The phosphorus-containing compound to be contained may be a reactive type or an additive type. Specific examples of the phosphorus-containing compound include phosphoric acid esters such as trimethyl phosphate, triethyl phosphate, tricresyl phosphate, trixylylenyl phosphate, cresyldiphenyl phosphate, cresyl-2,6-dixylylenyl phosphate, 1,3-phenylenebis(dixylylenyl phosphate), 1,4-phenylenebis(dixylylenyl phosphate) and 4,4'-biphenyl(dixylylenyl phosphate); phosphanes such as 9,10-dihydro-9-oxa-10-phosphaphenanthrene-10-oxide and 10-(2,5-dihydroxyphenyl)-10H-9-oxa-10-phosphaphenanthrene-10-oxide; phosphorus-containing epoxy compounds obtained by reacting epoxy resins with the active hydrogen of the phosphanes, red phosphorus and the like, and phosphoric acid esters, phosphanes or phosphorus-containing epoxy compounds are preferred, while 1,3-phenylenebis(dixylylenyl phosphate), 1,4-phenylenebis(dixylylenyl phosphate), 4,4'-biphenyl(dixylylenyl phosphate), or phosphorus-containing epoxy compounds are particularly preferred. The content of the phosphorus-containing compound is preferably such that the ratio of phosphorus-containing compound/all epoxy resins=0.1 to 0.6. If the ratio is 0.1 or less, flame retardancy is insufficient, and if the ratio is 0.6 or more, there is a risk that there may be adverse effects on the hygroscopic property and dielectric properties of the cured product.

The curable resin composition (b) of the present invention can also contain a binder resin, if necessary, in order to improve the film forming ability of the composition. Examples of the binder resin include, but not limited to, butyral-based resins, acetal-based resins, acryl-based resins, epoxy-nylon-based resins, NBR-phenol-based resins, epoxy-NBR-based resins, polyamide-based resins, polyimide-based resins, silicone-based resins and the like. The amount of mixing of the binder resin is preferably in the scope of not impairing the flame retardancy and thermal resistance of the cured product, and is used as necessary, in an amount of usually 0.05 to 50 parts by weight, and preferably 0.05 to 20 parts by weight, based on 100 parts by weight of the desired resin component.

The curable resin composition (b) of the present invention can contain a curing accelerator, if necessary. The curing accelerator is not particularly limited, but organometallic salts or organometallic complexes of iron, copper, zinc, cobalt, nickel, manganese and tin, and imidazoles may be mentioned. Specific examples of the organometallic salts or organometallic complexes include naphthenates such as zinc naphthenate, cobalt naphthenate, copper naphthenate, lead naphthenate and zinc naphthenate; octylates such as tin octylate and zinc octylate; and metal chelate compounds such as lead acetylacetonate, copper acetylacetonate, cobalt acetylacetonate and dibutyltin maleate. Examples of the imidazoles include various imidazoles such as 2-methylimidazole, 2-phenylimidazole, 2-undecylimidazole, 2-heptadecylimidazole, 2-phenyl-4-methylimidazole, 1-benzyl-2-methylimidazole, 1-cyanoethyl-2-methylimidazole, 1-cyanoethyl-2-phenylimidazole, 1-cyanoethyl-2-undecylimidazole, 2,4-diamino-6-(2'-methylimidazole(1'))ethyl-s-triazine, 2,4-diamino-6-(2'-undecylimidazole(1')ethylethyl-s-triazine, 2,4-diamino-6-(2'-ethyl, 4-methylimidazole(1'))ethyl-s-triazine, isocyanuric acid adduct of 2,4-diamino-6-(2'-methylimidazole(1'))ethyl-s-triazine, 2:3 adduct of 2-methylimidazole and isocyanuric acid, isocyanuric acid adduct of 2-phenylimidazole, 2-phenyl-3,5-dihydroxymethylimidazole and 2-phenyl-3,5-dicyanoethoxymethylimidazole; and salts of these imidazoles with polybasic carboxylic acids such as phthalic acid, isophthalic acid, terephthalic acid, trimellitic acid, pyromellitic acid, naphthalenedicarboxylic acid, maleic acid and oxalic acid. The curing accelerator is used as necessary, in an amount of usually 0.01 to 5 parts by weight, and preferably 0.1 to 3 parts by weight, based on 100 parts by weight of the resin components.

The curable resin composition (b) of the present invention may contain a filler material. Examples of the filler material include fused silica, crystalline silica, silicon carbide, silicon nitride, boron nitride, calcium carbonate, barium sulfate, calcium sulfate, mica, talc, clay, alumina, magnesium oxide, zirconium oxide, aluminum hydroxide, magnesium hydroxide, calcium silicate, aluminum silicate, lithium aluminum silicate, zirconium silicate, barium titanate, glass fiber, carbon fiber, molybdenum disulfide, asbestos and the like, and preferred examples include fused silica, crystalline silica, silicon nitride, boron nitride, calcium carbonate, barium sulfate, calcium sulfate, mica, talc, clay, alumina and aluminum hydroxide. These filler materials may be used individually or as mixtures of two or more species.

The curable resin composition (b) of the present invention may appropriately contain a colorant, a coupling agent, a leveling agent, an ion scavenger and the like according to the purpose of use. The colorant is not particularly limited, and various organic dyes such as phthalocyanine, azo, disazo, quinacridone, anthraquinone, flavanthrone, perinone, perylene, dioxazine, condensed azo and azomethine; and inorganic pigments such as titanium oxide, lead sulfate, chrome yellow, zinc yellow, chrome vermillion, Bengal Red, cobalt magenta, navy blue, blue, Prussian blue, carbon black, chrome green, chromium oxide and cobalt green may be mentioned.

Examples of the coupling agent include silane-based coupling agents such as 3-glycidoxypropyltrimethoxysilane, 3-glycidoxypropyltrimethoxysilane, 3-glycidoxypropylmethyldimethoxysilane, 3-glycidoxypropylmethyldimethoxysilane, 2-(3,4-epoxycyclohexyl)ethyltrimethoxysilane, N-(2-aminoethyl)-3-aminopropylmethyldimethoxysilane, N-(2-aminoethyl)-3-aminopropylmethyltrimethoxysilane, 3-aminopropyltriethoxysilane, 3-mercaptopropyltrimethoxysilane, vinyltrimethoxysilane, N-(2-(vinylbenzylamino)ethyl)-3-aminopropyltrimethoxysilane hydrochloride, 3-methacryloxypropyltrimethoxysilane, 3-chloropropylmethyldimethoxysilane and 3-chloropropyltrimethoxysilane; titanium-based coupling agents such as isopropyl (N-ethylaminoethylethylamino)titanate, titanium di(dioctylpyrophosphate)oxyacetate, tetraisopropyl di(dioctylphosphite) titanate and neoalkoxytri(p-N-(D-aminoethyl)aminophenyl) titanate; and zirconium- or aluminum-based coupling agents such as Zr-acetylacetonate, Zr-methacrylate, Zr-propionate, neoalkoxytris(dodecanoyl)benzenesulfonyl zirconate, neoalkoxytris(ethylenediaminoethyl) zirconate, neoalkoxytris(m-aminophenyl) zirconate, ammonium zirconium carbonate, Al-acetylacetonate, Al-methacrylate and Al-propionate, while silane-based coupling agents are preferred. By using a coupling agent, the moisture resistant reliability of the cured product is improved, and a cured product having less reduction in the adhesive strength after moisture absorption is obtained.

Examples of the leveling agent include oligomers having a molecular weight of 4000 to 12000 formed from acrylates such as ethyl acrylate, butyl acrylate and 2-ethylhexyl acrylate, epoxidated soybean fatty acids, epoxidated abietyl alcohol, hydrogenated castor oil, modified silicones, anionic and nonionic surfactants, and the like.

The curable resin composition (b) of the present invention can be obtained by, for example, mixing a cyanate resin and/or a prepolymer using the same as a raw material, an epoxy resin component including an epoxy resin, and if necessary, additive components such as a phosphorus-containing compound, a curing accelerator, a binder resin, an ion scavenger, a filler, a coupling agent, a colorant and a leveling agent using a Henschel mixer, a planetary mixer or the like, and then uniformly dispersing the mixture using a twin roll, kneader, an extruder, a sand grinder or the like.

The curable resin composition (b) of the present invention can be made into a varnish-like composition (hereinafter, simply referred to as varnish), by uniformly mixing the above-described various components at predetermined ratios in a solvent. Examples of the solvent that can be used include γ-butyrolactones, amide-based solvents such as N-methylpyrrolidone (NMP), N,N-dimethylformamide (DMF), N,N-dimethylacetamide and N,N-dimethylimidazolidinone; sulfones such as tetramethylenesulfone; ether-based solvents such as diethylene glycol dimethyl ether, diethylene glycol diethyl ether, propylene glycol diethyl ether, propylene glycol monomethyl ether monoacetate, tetrahydrofuran and dioxane; ketone-based solvents such as methyl ethyl ketone and methyl isobutyl ketone; and aromatic solvents such as toluene and xylene. These solvents may be used individually, or as mixtures of two or more species. The solvent is used in an amount such that the solids concentration in the varnish (concentration of components other than the solvent) is in the range of usually 10 to 80% by weight, and preferably 30 to 70% by weight.

To obtain a cured product of the curable resin composition (b) of the present invention, thermal curing may be performed under the conditions according to the curing system. For example, in the case where a printed board application is contemplated, curing conditions of 160 to 240° C. for 0.5 to 2 hours are general.

A build-up wiring board using the curable resin composition (b) of the present invention in the interlayer insulation layer, can be produced using a known method, and for example, but without limitation, such board is obtained by bonding a resin-clad metal foil using the resin composition of the present invention, to a hard laminate as the core plate, and then forming wiring and vias through etching and plating.

The resin-clad metal foil for the build-up wiring board using the curable resin composition (b) of the present invention in the interlayer insulation layer, can be produced using a known method, and for example, but without limitation, the metal foil can be obtained by applying the resin composition of the present invention on an electrolytic copper foil using a comma coater, and removing the solvent using an in-line dryer. Also, a prepreg obtained by impregnating a base material such as glass fiber, carbon fiber, polyester fiber, polyamide fiber, alumina fiber or paper with the varnish, and half-drying the resultant under heating, is laminated and molded by hot pressing, to thus obtain a laminated sheet.

The cured product obtained in the present invention can be used in various applications. Specifically, general applications where a heat-curable resin such as an epoxy resin is used may be mentioned, and examples thereof include adhesives, paints, coating materials, molding materials (including sheets, films, FRP and the like), insulating materials (including printed boards, wire coatings and the like), sealants as well as additives to other resins, and the like.

As for the adhesives, there may be mentioned adhesives for engineering, construction, automobile, general stationery and medicine, as well as adhesives for electronic materials. Among them, examples of the adhesives for electronic materials include interlayer adhesives for multilayer boards such as build-up boards; adhesives for semiconductor such as die bonding agent and underfill; adhesives for packaging such as underfill for BGA reinforcement, anisotropic conductive film (ACF) and anisotropic conductive paste (ACP); and the like.

Examples of the sealant include potting, dipping and transfer mold sealants for the use in condensers, transistors, diodes, emission diodes, IC, LSI and the like; potting sealants for the use in COB, COF, TAB, etc. of the IC and LSI applications; underfills for the use in flip chips; sealants (including reinforcing underfill) for packaging IC packages such as QFP, BGA and CSP; and the like.

The epoxy resin of the present invention can also be used as a component of photo/heat-curable epoxy resin compositions, and is particularly suitable for the solder resist application. In this case, as the components other than the epoxy resin of the present invention, there may be mainly mentioned an aqueous alkali solution-soluble resin, a cross-linking agent and a photopolymerization initiator.

An alkali-soluble resin is a compound having an ethylenic unsaturated group and an acidic functional group such as a carboxyl group at the same time. Examples thereof include carboxylic acid-containing acrylate compounds having a structure in which an acid anhydride is added to an epoxy acrylate compound or an epoxy methacrylate, and more specifically, KAYARAD CCR series, KAYARAD ZFR series, KAYARAD ZAR series and the like manufactured by Nippon Kayaku Co., Ltd. may be mentioned.

A cross-linking agent is a compound having two or more of unsaturated double bonds, and preferably has an acryl group or a methacryl group as the functional group. Specifically, KAYARAD HX-220, DPHA, DPCA-30, DPCA-60, PET-30 and the like manufactured by Nippon Kayaku Co., Ltd. may be mentioned.

Examples of the photopolymerization initator include generally known radical type photoreaction initiators, such as benzoins such as benzoin, benzoin methyl ether, benzoin ethyl ether, benzoin propyl ether and benzoin isobutyl ether; acetophenones such as acetophenone, 2,2-diethoxy-2-phenylacetophenone, 2,2-diethoxy-2-phenylacetophenone, 1,1-dichloroacetophenone, 2-hydroxy-2-methyl-phenylpropan-1-one, diethoxyacetophenone, 1-hydroxycyclohexyl phenyl ketone and 2-methyl-1-[4-(methylthio)phenyl]-2-morpholino-propan-1-one; anthraquinones such as 2-ethylanthraquinone, 2-t-butylanthraquinone, 2-chloroanthraquinone and 2-amylanthraquinone; thioxantones such as 2,4-diethylthioxantone, 2-isopropylthioxantone and 2-chlorothioxantone; ketals such as acetophenone dimethyl ketal and benzyl dimethyl ketal; benzophenones such as benzophenone, 4-benzoyl-4'-methyldiphenyl sulfide and 4,4'-bismethylaminobenzophenone; and phosphine oxides such as 2,4,6-trimethylbenzoyldiphenylphosphine oxide and bis(2,4,6-trimethylbenzoyl)-phenylphosphine oxide.

Furthermore, this photo/heat-curable resin composition can employ any compounds that are conventionally used in photo/heat-curable resin compositions, in addition to the compounds described above.

As for other additives, epoxy resins other than the epoxy resin of the present invention (described above) can also be used in combination, and also, as in the case of the curable resin composition (a) described above, a filler material, pigments, silicone, a leveling agent, a deforming agent, a polymerization inhibitor or the like can be added for the purpose of enhancing general performance of the composition. This photo/heat-curable resin composition thus obtained can be used as a varnish-like composition containing solvent, or can also be dealt with as a film-like composition with the solvent removed in advance (so-called a dry film).

The photo/heat-curable resin composition can be cured by irradiation with an energy ray such as an ultraviolet ray or an electron beam, and by heating operation. Curing by irradiation with an energy ray such as an ultraviolet ray can be performed by a generally known method. For example, in the case of irradiating with an ultraviolet ray, an ultraviolet generating apparatus such as a low pressure mercury lamp, a high pressure mercury lamp, an ultrahigh pressure mercury lamp, a xenone lamp or an ultraviolet emitting laser (excimer-laser or the like), may be favorably used. Thereafter, if necessary, the composition can be further irradiated with an ultraviolet ray, and then subjected to a heat treatment at a temperature of usually 100 to 200° C., and preferably 140 to 180° C., to obtain the cured product of the present invention. Furthermore, according to the purpose of use, it is also possible with the subject photo/heat-curable resin composition to perform patterning by removing unexposed parts by an alkali treatment.

EXAMPLES

Next, the present invention will be described in more detail by way of Examples, but the present invention is not intended to be limited to these Examples. Hereinafter, unless stated otherwise, the "parts" means parts by weight. Furthermore, in the Examples, the epoxy equivalent, softening point and melt viscosity were measured under the following conditions.

1) Epoxy equivalent: Measured by the method according to JIS K-7236.

2) Softening point: Measured by the method according to JIS K-7234.

3) Measurement conditions for GPC are as follows.
Model: Shodex SYSTEM-21, column: KF-804L+KF-803L (×2 pieces), connecting eluent: THF (tetrahydrofuran); 1 ml/min., 40° C., Detector: UV (254 nm; UV-41) Sample: about 0.4% THF solution (20 μl injection)
Calibration curve: used standard polystyrene manufactured by Shodex 4) Melt viscosity: Melt viscosity at 150° C., ICI cone and plate No. 3,
Amount of sample: 0.155±0.005 g.

Example 1

While a flask equipped with a stirrer, a thermometer and a condenser was purged with nitrogen gas, 230 parts of a phenol aralkyl resin (synthesized according to the method described in Patent Document 3. Hydroxyl equivalent: 230 g/eq, softening point: 95° C., all of Ar's in the formula (2) were the groups of the formula (3); R's were all hydrogen atoms; n=3.1 (average number)), 231 parts of epichlorohydrin, and 35 parts of methanol were introduced to the flask. The mixture was allowed to dissolve under stirring, and the temperature was elevated to 75° C. Subsequently, 40 parts of sodium hydroxide flakes were added in divided portions over 90 minutes, and then the mixture was further subjected to a post-reaction for 1 hour at 70° C. After completion of the reaction, the reaction product was washed with 300 parts of water, and excess solvent such as epichlorohydrin was distilled off from the oil layer using a rotary evaporator, at 140° C. and under reduced pressure. 300 parts of methyl ethyl ketone and 300 parts of toluene were added to the residue to dissolve the residue, and the temperature was elevated to 70° C. 10 parts of a 30 wt % aqueous solution of sodium hydroxide was added while stirring, and the reaction was performed for 1 hour. Washing with water was performed until the washing water turned neutral, and the solvent was distilled off from the obtained solution using a rotary evaporator at 180° C. and under reduced pressure, to thus obtain 271 parts of the desired epoxy resin (EPI). The epoxy equivalent of the resulting epoxy resin was 312 g/eq, the value of the relationship expression (a) was 203, the softening point was 82° C., and the melt viscosity (150° C.) was 1.13 Pa·s. The hydroxyl equivalent of the current epoxy resin calculated from the hydroxyl equivalent A was 3820 g/eq.

Example 2

While a flask equipped with a stirrer, a thermometer and a condenser was purged with nitrogen gas, 215 parts of a phenol aralkyl resin (synthesized according to the method described in Patent Document 3. Hydroxyl equivalent: 215 g/eq, softening point: 82° C., all of Ar's in the formula (2) were the groups of the formula (3); R's were all hydrogen atoms; n=2.1 (average number)), 231 parts of epichlorohydrin, and 23 parts of methanol were introduced to the flask. The mixture was allowed to dissolve under stirring, and the temperature was elevated to 75° C. Subsequently, 40 parts of sodium hydroxide flakes were added in divided portions over 90 minutes, and then the mixture was further subjected to a post-reaction for 1 hour at 70° C. After completion of the reaction, the reaction product was washed with 300 parts of water, and excess solvent such as epichlorohydrin was distilled off from the oil layer using a rotary evaporator, at 140° C. and under reduced pressure. 300 parts of methyl ethyl ketone and 300 parts of toluene were added to the residue to dissolve the residue, and the temperature was elevated to 70° C. 10 parts of a 30 wt % aqueous solution of sodium hydroxide was added while stirring, and the reaction was performed for 1 hour. Washing with water was performed until the washing water turned neutral, and the solvent was distilled off from the obtained solution using a rotary evaporator at 180° C. and under reduced pressure, to thus obtain 258 parts of the desired epoxy resin (EP2). The epoxy equivalent of the resulting epoxy resin was 304 g/eq, the value of the relationship expression ($\alpha$) was 188, the softening point was 75° C., and the melt viscosity (150° C.) was 0.64 Pa·s. The hydroxyl equivalent of the current epoxy resin calculated from the hydroxyl equivalent A was 2970 g/eq.

Example 3

While a flask equipped with a stirrer, a thermometer and a condenser was purged with nitrogen gas, 215 parts of a phenol aralkyl resin (synthesized according to the method described in Patent Document 3. Hydroxyl equivalent: 215 g/eq, softening point: 82° C., all of Ar's in the formula (2) were the groups of the formula (3); R's were all hydrogen atoms; n=2.1 (average number)), 370 parts of epichlorohydrin, and 37 parts of methanol were introduced to the flask. The mixture was allowed to dissolve under stirring, and the temperature was elevated to 75° C. Subsequently, 30 parts of sodium hydroxide flakes were added in divided portions over 90 minutes, and then the mixture was further subjected to a post-reaction for 1 hour at 70° C. After completion of the reaction, the reaction product was washed with 300 parts of water, and excess solvent such as epichlorohydrin was distilled off from the oil layer using a rotary evaporator, at 140° C. and under reduced pressure. 300 parts of methyl ethyl ketone and 300 parts of toluene were added to the residue to dissolve the residue, and the temperature was elevated to 70° C. 10 parts of a 30 wt % aqueous solution of sodium hydroxide was added while stirring, and the reaction was performed for 1 hour. Washing with water was performed until the washing water turned neutral, and the solvent was distilled off from the obtained solution using a rotary evaporator at 180° C. and under reduced pressure, to thus obtain 249 parts of the desired epoxy resin (EP3). The epoxy equivalent of the resulting epoxy resin was 310 g/eq, the value of the relationship expression ($\alpha$) was 167, the softening point was 78° C., and the melt viscosity (150° C.) was 0.82 Pa·s. The hydroxyl equivalent of the current epoxy resin calculated from the hydroxyl equivalent A was 2673 g/eq.

Comparative Example 1

While a flask equipped with a stirrer, a thermometer and a condenser was purged with nitrogen gas, 249 parts of a phenol aralkyl resin (synthesized according to the method described in Patent Document 3. Hydroxyl equivalent: 249 g/eq, softening point: 95° C., all of Ar's in the formula (2) were the groups of the formula (3); R's were all hydrogen atoms; n=6.5 (average number)), 740 parts of epichlorohydrin, and 74 parts of methanol were introduced to the flask. The mixture was allowed to dissolve under stirring, and the temperature was elevated to 75° C. Subsequently, 42 parts of sodium hydroxide flakes were added in divided portions over 90 minutes, and then the mixture was further subjected to a post-reaction for 1 hour at 70° C. After completion of the reaction, the reaction product was washed with 300 parts of water, and excess solvent such as epichlorohydrin was distilled off from the oil layer using a rotary evaporator, at 140° C. and under reduced pressure. 300 parts of methyl ethyl ketone and 300 parts of toluene were added to the residue to dissolve the residue, and the temperature was elevated to 70° C. 10 parts of a 30 wt % aqueous solution of sodium hydroxide was added while stirring, and the reaction was performed for 1 hour. Washing with water was performed until the washing water turned neutral, and the solvent was distilled off from the obtained solution using a rotary evaporator at 180° C. and under reduced pressure, to thus obtain 301 parts of the desired epoxy resin (EP4). The epoxy equivalent of the resulting epoxy resin was 306 g/eq, the value of the relationship expression ($\alpha$) was 269, the softening point was 75° C., and the melt viscosity (150° C.) was 0.52 Pa·s. The hydroxyl equivalent of the current epoxy resin calculated from the hydroxyl equivalent A was 9998 g/eq.

Comparative Example 2

While a flask equipped with a thermometer, a dropping funnel, a condenser tube and a stirrer was purged with nitrogen gas, 290 parts of an epoxy resin NC-3000-H (manufactured by Nippon Kayaku Co., Ltd., epoxy equivalent: 290 g/eq., softening point 68° C., n value: 2.5 (average value)), and 15 parts of a phenol aralkyl resin MEH-7851SS (manufactured by Meiwa Plastic Industries, Ltd., hydroxyl equivalent: 203 g/eq., softening point: 65° C.) were introduced to the flask. The mixture was completely melted under stirring at 150° C., subsequently 0.29 parts of triphenylphosphine was added thereto, and the mixture was allowed to react for 4 hours, to obtain 305 parts of an epoxy resin for comparison (EP5). The epoxy equivalent of the resulting epoxy resin was 328 g/eq, the value of the relationship expression ($\alpha$) was 135, and the softening point was 84° C. The hydroxyl equivalent of the current epoxy resin calculated from the hydroxyl equivalent A was 2459 g/eq.

Test Examples 1 to 3

When the data of the obtained epoxy resins EP1, EP4 and commercially available NC-3000H are compared, the results shown in the following Table 1 are obtained. The results for a storage stability test indicate the evaluation results obtained by preparing a 70 wt % epoxy resin varnish of each of the tested epoxy resins using methyl ethyl ketone as the solvent, and storing the varnish in refrigeration at 5° C., 0° C. and −10° C., respectively, which results are expressed as the time taken for crystals to precipitate.

TABLE 1

| Test Example | Sample | Example or Comparative Example | sp/ (α) | OHeq. °C. | g/eq. | Storage stability 5° C. | 0° C. | −10° C. |
|---|---|---|---|---|---|---|---|---|
| 1 | EP1 | Example 1 | 203 | 82 | 3820 | Over 6 months | Over 6 months | Over 6 months |
| 2 | EP4 | Comparative Example 1 | 269 | 75 | 9998 | 4 months | 3 months | No test |
| 3 | NC-3000H | — | 271 | 67 | 5187 | 1 week | 4 days | 1 day |

From the above results, it was found that the epoxy resin of the present invention having a value of 250 or less for the relationship expression (α) was a resin having a very excellent storage stability as a varnish.

Test Examples 4 to 6

Hereinafter, evaluation of the cured product of the curable resin composition (a) will be described.

The epoxy resin of the present invention obtained in Example 2 (EP2), the epoxy resin obtained in Comparative Example 2 (EP5), and a commercially available phenol aralkyl type epoxy resin NC-3000-H (manufactured by Nippon Kayaku Co., Ltd.) were used to prepare compositions by mixing each of the resins with phenol novolac (manufactured by Meiwa Plastic Industries, Ltd., H-1, hydroxyl equivalent: 105 g/eq.) as a curing agent and triphenylphosphine (TPP) as a curing accelerator, at the mixing ratios (parts by weight) indicated in the following Table 2. A resin molded product was obtained by transfer molding the composition, and the molded product was cured for 2 hours at 160° C. and then for 8 hours at 180° C.

TABLE 2

|   |   | Test Example 4 | Test Example 5 | Test Example 6 |
|---|---|---|---|---|
| Epoxy resin | EP2 | 152 |   |   |
|   | EP5 |   | 164 |   |
|   | NC-3000-H |   |   | 144 |
| Curing agent | Phenol novolac | 53 | 53 | 53 |
| Curing accelerator | TPP | 1.5 | 1.6 | 1.5 |

The results of measuring the properties of the cured products thus obtained are presented in Table 3. In addition, the measurement of the property values was performed by the following methods.

Glass Transition Temperature:
DMA JIS K-7244-4
TMA Thermal Mechanical Measuring Apparatus: TM-7000 manufactured by Ulvac-Riko, Inc.
Rate of temperature increase: 2° C./min
Fracture toughness (K1C): ASTM E-399
Peel strength: JIS K-6911
Flexural strength: JIS K-6911

TABLE 3

|   | Test Example 4 | Test Example 5 | Test Example 6 |
|---|---|---|---|
| Epoxy resin under test | EP2 | EP5 | NC-3000H |
| α-value for epoxy resin under test | 188 | 135 | 257 |
| Glass transition temperature (DMA/° C.) | 176 | 170 | 175 |
| Glass transition temperature (TMA/° C.) | 140 | 127 | 154 |
| Fracture toughness (K1C) (MPa) | 26 | 24 | 22 |
| Peel Strength (Cu, kN/m) | 2.4 | 2.3 | 1.9 |
| Flexural strength (30° C., MPa) | 116 | 105 | 107 |

Test Examples 7 and 8

Hereinafter, the evaluation for the cured product of the curable resin composition (b) will be described.

Varnishes were prepared by mixing various components at the compositions indicated in Table 4. Each of the obtained varnishes was maintained in a constant temperature state at 5° C., and the presence or absence of crystal precipitation after storage for 1 month was investigated. Furthermore, a resin-clad copper foil was obtained by applying each of the resulting varnishes on an electrolytic copper foil (thickness 35 μm, manufactured by Furukawa Electric Co., Ltd.) with a comma coater to obtain a thickness after drying of 75 μm, and then removing the solvent under the drying conditions of heating for 2 minutes at 150° C. and then for 2 minutes at 170° C. This resin-clad copper foil was bonded on both sides of a non-halogen FR-4 substrate (TCL-W-555MU manufactured by Toshiba Chemical Corporation, thickness 0.4 mm) from which copper foil was removed by etching treatment, and the assembly was cured (1 hour at a pressure of 1 Pa and a temperature of 170° C.), to obtain a sample for flame retardancy test. Furthermore, a product obtained by removing the heated and dried residual parts from the copper foil, and compression molding the resultant, was subjected to the measurement of glass transition temperature. The measurement results for the storage stability, flame retardancy test and glass transition temperature of the varnishes are presented in Table 4.

In addition, the evaluation of the build-up wiring boards in the Table 4 was performed according to the UL standards with respect to the flame retardancy, and in the same manner as described above with respect to the glass transition temperature.

TABLE 4

|   | Test Example 7 | Test Example 8 |
|---|---|---|
| Mixing ratio (parts by weight) |   |   |
| Cyanate compound solution | 133 | 133 |
| Epoxy resin |   |   |
| EP1 | 20 |   |
| EP4 |   | 20 |
| Phosphorus compound | 30 | 30 |

TABLE 4-continued

|  | Test Example 7 | Test Example 8 |
|---|---|---|
| Curing accelerator | 1 | 1 |
| Binder resin | 20 | 20 |
| Solvent (DMF) | 90 | 90 |
| Measurement results: |  |  |
| Evaluation of build-up wiring board |  |  |
| Flame retardancy (UL94) | V-0 | V-0 |
| Glass transition temperature (° C.) | 209 | 209 |

*In Table 4,
Cyanate compound solution: Cyanate resin prepolymer B-40S (manufactured by Ciba Geigy K. K., an MEK solution of bisphenol A dicyanate resin, trimer content: 40% by weight, solids: 75% by weight)
Phosphorus compound: FP-500 (phosphorus-based flame retardant manufactured by Asahi Denka Co., Ltd.)
Binder resin: KAYAFLEX-BPAM01 (rubber-modified polyamide resin manufactured by Nippon Kayaku Co., Ltd.)
Curing accelerator: Nikka Octics Zinc 8% (a mineral spirit solution of zinc 2-ethylhexanoate manufactured by Nihon Kagaku Sangyo Co., Ltd.)

As seen from the above results, since the phenol aralkyl type epoxy resin of the present invention hardly undergoes precipitation of crystals even if dissolved in a solvent and stored at low temperature, the epoxy resin can prevent deterioration of the performance after long-term storage of a curable resin composition using this epoxy resin, thus contributing to an improvement in the storage stability of the resin composition. Furthermore, it can be seen that the cured product of the obtained curable resin composition (a) has high thermal resistance and mechanical properties. The curable resin composition (b) using a cyanate resin is also shown to possess thermal resistance and flame retardancy. Therefore, the epoxy resin of the present invention and the curable resin composition are very useful in a wide range of applications such as molding materials, casting materials, lamination materials, coating materials, adhesives and resists.

Test Examples 9 and 10

The epoxy resin obtained in Example 1 (EP1) and a phenol-biphenylaralkyl type epoxy resin NC-3000 (manufactured by Nippon Kayaku Co., Ltd., epoxy equivalent: 275 g/eq., softening point 57° C., value of relationship expression (a)=272) by way of comparison were used to prepare epoxy resin varnishes at the compositions (values are in parts) indicated in Table 5.

Each of the resin varnishes prepared was coated on a peel-processed PET film using a hand applicator, so that the dried film thickness would be 25 μm. After the coating, the film was dried in a hot air oven at 80° C. for 60 minutes, and then a PET film was dry laminated, to thus obtain a dry film.

This dry film was adhered on one side of a copper-clad laminate while peeling off the PET film on the side, and after the adhering, the assembly was vertically exposed to ultraviolet rays through a pattern-described mask. Thereby, a polycarboxylic acid prepolymer was formed in the composition.

After completion of the exposure, the remaining PET film on the other side was peeled off, and the peeling properties were evaluated. Subsequently, unexposed parts were washed away using a 1% aqueous sodium carbonate solution, and a curing reaction was performed in a hot air oven at 150° C. for 120 minutes, to thus form a cured film for insulation layer on the copper-clad laminate.

Evaluation of this cured film was performed as follows. The results are presented in Table 6.

Evaluation of peeling properties: Easiness of peeling when the covering PET film was removed by peeling after the completion of exposure.

○: Peeling can be achieved neatly.
Δ: The peeled layer had the B-stage film described above in some parts, but the product can be used if peeled off carefully.
x: The peeled layer had the B-stage film, and thus the product cannot be used.

Evaluation of thermal resistance: To a copper-clad laminate having an insulating layer obtained after completing a thermal curing reaction, crosscuts (according to JIS K5600-5-6:1999) were inserted. A flux was applied, and then the resultant was immersed in a solder bath at 290° C. for 1 minute. After the immersion, the substrate was taken out, washed with water, and then dried with compressed air. The adhesiveness of the insulation layer to the substrate was evaluated by a cellophane tape peeling test (JIS K5600-5-6: 1999).

TABLE 5

|  | Test Example 9 | Test Example 10 |
|---|---|---|
| EP1 (epoxy resin) | 17.0 | — |
| NC-3000 (epoxy resin) | — | 17.0 |
| CCR-1194 | 46.5 | 46.5 |
| DPCA-60 (reactive modifier) | 15.0 | 15.0 |
| Melamine (curing catalyst) | 0.8 | 0.8 |
| Irgacure 907 (ultraviolet initiator) | 4.5 | 4.5 |
| DETX-S (ultraviolet initiator) | 0.9 | 0.9 |
| KS-66 (defoaming agent) | 1.8 | 1.8 |
| MIBK (solvent) | 13.5 | 13.5 |

Remarks: In Table 5
CCR-1194; Cresol novolac type acid anhydride-modified epoxy acrylate KAYARAD CCR-1192 (manufactured by Nippon Kayaku Co., Ltd., a methyl isobutyl ketone solution, solids 65%, acid value 100 mg KOH/g)
DPCA-60; Caprolactam-modified polyfunctional acrylate resin manufactured by Nippon Kayaku Co., Ltd.
Irgacure 907; 2-Methyl-(4-(methylthio)phenyl)-2-morpholino-1-propane manufactured by Ciba Specialty Chemicals, Ltd.
DETX-S; 2,4-diethylthioxantone manufactured by Nippon Kayaku Co., Ltd.
KS-66; defoaming agent manufactured by Shin-Etsu Chemical Co., Ltd.
MIBK; Methyl isobutyl ketone

TABLE 6

| Evaluation results | | |
|---|---|---|
|  | Test Example 9 | Test Example 10 |
| Evaluation of peeling properties | ○ | Δ |
| Evaluation of thermal resistance | 100/100 | 90/100 |

From the above results, it was clear that the epoxy resin of the present invention and the curable resin composition exhibited curing properties with excellent thermal resistance, as compared with commercially available epoxy resins having a similar skeleton.

Example 4

While a flask equipped with a stirrer, a thermometer and a condenser was purged with nitrogen gas, 240 parts of a phenol aralkyl resin (synthesized according to the method described in Patent Document 3. Hydroxyl equivalent: 240 g/eq, softening point: 101° C., all of Ar's in the formula (2) were the groups of the formula (3); R's were all hydrogen atoms; n=4.5 (average number)), 277 parts of epichlorohydrin, 28 parts of methanol and 28 parts of t-butyl alcohol were introduced to the flask. The mixture was allowed to dissolve under stirring, and the temperature was elevated to 75° C. Subsequently, 42 parts of sodium hydroxide flakes were added in divided portions over 90 minutes, and then the mixture was further subjected to a post-reaction for 1 hour at 70° C. After completion of the reaction, the reaction product was washed with 300 parts of water, and excess solvent such as epichlorohydrin was distilled off from the oil layer using a rotary evaporator, at 140° C. and under reduced pressure. 300 parts of methyl ethyl ketone and 300 parts of toluene were added to the residue to dissolve the residue, and the temperature was elevated to 70° C. 10 parts of a 30 wt % aqueous solution of sodium hydroxide was added while stirring, and the reaction was performed for 1 hour. Washing with water was performed until the washing water turned neutral, and the solvent was distilled off from the obtained solution using a rotary evaporator at 180° C. and under reduced pressure, to thus obtain 220 parts of the desired epoxy resin (EP6). The epoxy equivalent of the resulting epoxy resin was 329 g/eq, the value of the relationship expression ($\alpha$) was 180, and the softening point was 79° C. The hydroxyl equivalent of the current epoxy resin calculated from the hydroxyl equivalent A was 3643 g/eq.

Example 5

While a flask equipped with a stirrer, a thermometer and a condenser was purged with nitrogen gas, 225 parts of a phenol aralkyl resin (synthesized according to the method described in Patent Document 3. Hydroxyl equivalent: 225 g/eq, softening point: 84° C., all of Ar's in the formula (2) were the groups of the formula (3); R's were all hydrogen atoms; n=2.2 (average number)), 462 parts of epichlorohydrin, and 116 parts of dimethylsulfoxide were introduced to the flask. The mixture was allowed to dissolve under stirring, and the temperature was elevated to 45° C. Subsequently, 41 parts of sodium hydroxide flakes were added in divided portions over 90 minutes, and then the mixture was further subjected to a post-reaction for 2 hours at 40° C. and then for 1 hour at 70° C. After completion of the reaction, excess solvent such as epichlorohydrin or dimethylsulfoxide was distilled off using a rotary evaporator under reduced pressure. 250 parts of methyl ketone and 250 parts of toluene were added to the residue to dissolve the residue, the solution was washed with 200 parts of water to remove any remaining salts or the like, and then the temperature of the oil layer was elevated to 70° C. 10 parts of a 30 wt % aqueous solution of sodium hydroxide was added while stirring, and the reaction was performed for 1 hour. Washing with water was performed until the washing water turned neutral, and about 400 parts of the solvents were distilled off from the oil layer using a rotary evaporator. To this, 14 parts of a phenol aralkyl resin (synthesized according to the method described in Patent Document 3. Hydroxyl equivalent: 197 g/eq, softening point: 64° C., all of Ar's in the formula (2) were the groups of the formula (3); R's were all hydrogen atoms; n=1.6 (average number)) and 0.3 parts of triphenylphosphine were added, and the mixture was stirred for 40 hours under reflux. The solvent was distilled off from the resulting solution using a rotary evaporator at 180° C. and under reduced pressure, to obtain 260 parts of the desired epoxy resin (EP7). The epoxy equivalent of the resulting epoxy resin was 324 g/eq, the value of the relationship expression ($\alpha$) was 154, the softening point was 80° C., and the melt viscosity (150° C.) was 0.88 Pa·s. The hydroxyl equivalent of the current epoxy resin calculated from the hydroxyl equivalent A was 2759 g/eq.

Example 6

While a flask equipped with a stirrer, a thermometer and a condenser was purged with nitrogen gas, 225 parts of a phenol aralkyl resin (synthesized according to the method described in Patent Document 3. Hydroxyl equivalent: 225 g/eq, softening point: 84° C., all of Ar's in the formula (2) were the groups of the formula (3); R's were all hydrogen atoms; n=2.2 (average number)), 462 parts of epichlorohydrin, and 116 parts of dimethylsulfoxide were introduced to the flask. The mixture was allowed to dissolve under stirring, and the temperature was elevated to 45° C. Subsequently, 41 parts of sodium hydroxide flakes were added in divided portions over 90 minutes, and then the mixture was further subjected to a post-reaction for 2 hours at 40° C. and then for 1 hour at 70° C. After completion of the reaction, excess solvent such as epichlorohydrin or dimethylsulfoxide was distilled off using a rotary evaporator under reduced pressure. 250 parts of methyl ketone and 250 parts of toluene were added to the residue to dissolve the residue, the solution was washed with 200 parts of water to remove any remaining salts or the like, and then the temperature of the oil layer was elevated to 70° C. 10 parts of a 30 wt % aqueous solution of sodium hydroxide was added while stirring, and the reaction was performed for 1 hour. Washing with water was performed until the washing water turned neutral, and the solvents were distilled off from the oil layer using a rotary evaporator, to obtain a resinous epoxy resin (EP8). The epoxy equivalent of the resulting epoxy resin (EP8) was 288 g/eq, the value of the relationship expression ($\alpha$) was 270, the softening point was 69° C., and the melt viscosity (150° C.) was 0.31 Pa·s. The hydroxyl equivalent of the current epoxy resin calculated from the hydroxyl equivalent A was 6376 g/eq.

200 parts of the obtained epoxy resin (EP8), parts of a phenol aralkyl resin (synthesized according to the method described in Patent Document 3. Hydroxyl equivalent: 189 g/eq, softening point: 119° C. (semi-crystalline), all of Ar's in the formula (2) were the groups of the formula (3); R's were all hydrogen atoms; n=1.1 (average number), and 0.5 parts of triphenylphosphine were added, and the mixture was stirred for 40 hours under reflux. The solvent was distilled off from the resulting solution using a rotary evaporator at 180° C. and under reduced pressure, to obtain 260 parts of the desired epoxy resin (EP9). The epoxy equivalent of the resulting epoxy resin was 320 g/eq, the value of the relationship expression ($\alpha$) was 166, the softening point was 77° C., and the melt viscosity (150° C.) was 0.75 Pa·s. The hydroxyl equivalent of the current epoxy resin calculated from the hydroxyl equivalent A was 2920 g/eq.

Comparative Example 3

While a flask equipped with a stirrer, a thermometer and a condenser was purged with nitrogen gas, 225 parts of a phenol aralkyl resin (synthesized according to the method described in Patent Document 3. Hydroxyl equivalent: 225 g/eq, softening point: 84° C., all of Ar's in the formula (2) were the groups of the formula (3); R's were all hydrogen atoms; n=2.2 (average number)), 462 parts of epichlorohydrin, and 116 parts of dimethylsulfoxide were introduced to the flask. The mixture was allowed to dissolve under stirring, and the temperature was elevated to 45° C. Subsequently, 41 parts of sodium hydroxide flakes were added in divided portions over 90 minutes, and then the mixture was further subjected to a post-reaction for 2 hours at 40° C. and then for 1 hour at 70° C. After completion of the reaction, excess solvent such as epichlorohydrin or dimethylsulfoxide was distilled off using a rotary evaporator under reduced pressure. 250 parts of methyl ketone and 250 parts of toluene were added to the residue to dissolve the residue, the solution was washed with 200 parts of water to remove any remaining salts or the like, and then the temperature of the oil layer was elevated to 70° C. 10 parts of a 30 wt % aqueous solution of sodium hydroxide was added while stirring, and the reaction was performed for 1 hour. Washing with water was performed until the washing water turned neutral, and the solvents were distilled off from the oil layer using a rotary evaporator, to obtain a resinous epoxy resin (EP10). The epoxy equivalent of the resulting epoxy resin (EP10) was 288 g/eq, the value of the relationship expression (α) was 270, the softening point was 69° C., and the melt viscosity (150° C.) was 0.31 Pa·s. The hydroxyl equivalent of the current epoxy resin calculated from the hydroxyl equivalent A was 6376 g/eq.

Comparative Example 4

While a flask equipped with a thermometer, a dropping funnel, a condenser tube and a stirrer was purged with nitrogen gas, 270 parts of an epoxy resin NC-3000-H (manufactured by Nippon Kayaku Co., Ltd., epoxy equivalent: 288 g/eq., softening point 68° C., n value: 2.5 (average value)), and 30 parts of a phenol aralkyl resin MEH-7851 SS (manufactured by Meiwa Plastic Industries, Ltd., hydroxyl equivalent: 203 g/eq., softening point: 65° C.) were introduced to the flask. The mixture was completely dissolved under stirring at 150° C., subsequently 0.40 parts of triphenylphosphine was added thereto, and the mixture was allowed to react for 4 hours, to obtain 300 parts of an epoxy resin for comparison (EP11). The epoxy equivalent of the resulting epoxy resin was 384 g/eq, the value of the relationship expression (α) was 5, the softening point was 94° C., and the melt viscosity (150° C.) was 3.24 Pa·s. The hydroxyl equivalent of the current epoxy resin calculated from the hydroxyl equivalent A was 1593 g/eq.

Test Examples 11 to 15

When the data of the obtained epoxy resins EP3, EP7, EP9, EP10 and commercially available NC-3000 (manufactured by Nippon Kayaku Co., Ltd., epoxy equivalent: 270 g/eq, softening point: 57° C., n value: 1.9 (average value)) are compared, the results shown in the following Table 7 are obtained. The results for a storage stability test indicate the evaluation results obtained by preparing a 70 wt % epoxy resin varnish of each of the tested epoxy resins using methyl ethyl ketone as the solvent, and storing the varnish in refrigeration at 5° C., which results are expressed as the time taken for crystals to precipitate.

TABLE 7

| Test Example | Sample | Example or Comparative Example | (α) | sp/° C. | OHeq. g/eq. | Storage stability 5° C. |
|---|---|---|---|---|---|---|
| 11 | EP3 | Example 3 | 167 | 78 | 2673 | Over 4 months |
| 12 | EP7 | Example 5 | 154 | 80 | 2759 | Over 4 months |
| 13 | EP9 | Example 6 | 166 | 77 | 2920 | Over 4 months |
| 14 | EP10 | Comparative Example 3 | 270 | 69 | 6376 | 1 month |
| 15 | NC-3000 | — | 271 | 57 | 5326 | 1 day |

Test Examples 16 to 18

Hereinafter, evaluation of the cured product of the curable resin composition (a) will be described.

The epoxy resins of the present invention obtained in Examples (EP6, EP9), the epoxy resin obtained in Comparative Example 4 (EP11), and a commercially available phenol aralkyl type epoxy resin NC-3000-H (manufactured by Nippon Kayaku Co., Ltd.) were used to prepare compositions by mixing each of the resins with a trisphenolmethane type phenol resin (manufactured by Nippon Kayaku Co., Ltd., KAYAHARD KTG-105, hydroxyl equivalent: 104 g/eq.) as a curing agent and triphenylphosphine (TPP) as a curing accelerator, at the mixing ratios (parts by weight) indicated in the following Table 8. A resin molded product was obtained by transfer molding the composition, and the molded product was cured for 50 minutes at 200° C.

TABLE 8

| | | Test Example 16 | Test Example 17 | Test Example 18 | Test Example 19 |
|---|---|---|---|---|---|
| Epoxy resin | EP6 | 109 | | | |
| | EP9 | | 106 | | |
| | EP11 | | | 128 | |
| | NC-3000H | | | | 93 |
| Curing agent | KAYAHARD KTG-105 | 35 | 35 | 35 | 35 |
| Curing accelerator | TPP | 1 | 1 | 1 | 1 |

The results of measuring the properties of the cured products thus obtained are presented in Table 9. In addition, the measurement of the property values was performed by the following methods.

Glass Transition Temperature:
TMA Thermal Mechanical Measuring Apparatus: TM-7000 manufactured by Ulvac-Riko, Inc.
Rate of temperature increase: 2° C./min
Flexural strength: JIS K-6911
(Regarding the value of TMA, due to the stress during curing, it was difficult to measure correct Tg. Thus, the value corresponds to the result of performing the measurement after initially elevating the temperature to 250° C. by 5° C./min, and then cooling).

TABLE 9

| | Test Example 16 | Test Example 17 | Test Example 18 | Test Example 19 |
|---|---|---|---|---|
| Epoxy resin under test | EP6 | EP9 | EP11 | NC-3000H |
| α-value for epoxy resin under test | 180 | 166 | 5 | 257 |
| Glass transition temperature (TMA/° C.) | 161 | 150 | 131 | 155 |
| Flexural strength (30° C., MPa) | 109 | 112 | 95 | 105 |

The invention claimed is:

1. A phenol aralkyl epoxy resin having a structure formed by binding at least a phenol with an aralkyl group as a linking group, and a structure represented by formula (1):

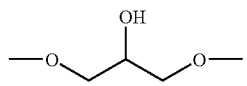

(1)

wherein the phenol aralkyl epoxy resin satisfies the following condition:

Condition: With A being the hydroxyl equivalent (measured according to JIS K 0070) of a phenol-modified epoxy resin obtained by adding a molar equivalent of phenol to the epoxy equivalent of the phenol aralkyl epoxy resin, and B being the epoxy equivalent of the phenol aralkyl epoxy resin, the relationship between A and B satisfies the following relationship expression (α):

$$150 \leq 1000 \times (A-B)/B \leq 203 \tag{$\alpha$}$$

2. The phenol aralkyl epoxy resin according to claim 1, being a reaction product of a phenol aralkyl resin having a structure represented by the following general formula (2), and epihalohydrin:

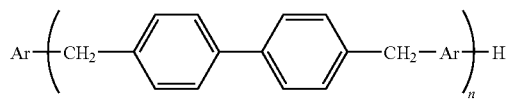
(2)

wherein each Ar represent phenols of the following general formula (3) or naphthols of the following general formula (3):

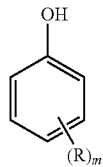
(3)

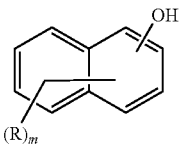
(4)

(wherein in the formula, each R represents a hydrogen atom, a hydrocarbon group having 1 to 15 carbon atoms, trifluoromethyl group, an allyl group or an aryl group, while R's are identical to or different from each other;

and m represents an integer from 0 to 3), while Ar's are identical to or different from each other, and when Ar's are different, they may be arranged in any order; and n represents an average of a repeating number from 1 to 10.

3. The phenol aralkyl epoxy resin according to claim 2, wherein all of R's are hydrogen atoms.

4. A phenol aralkyl epoxy resin varnish containing the phenol aralkyl epoxy resin according to any one of claims 1 to 3, and a solvent.

* * * * *